United States Patent [19]
Kuck

[11] 3,711,212
[45] Jan. 16, 1973

[54] TRAVEL LIMIT MECHANISM AND METHOD

[75] Inventor: Kermit T. Kuck, Sidney, Ohio

[73] Assignee: The Monarch Machine Tool Company

[22] Filed: Feb. 19, 1971

[21] Appl. No.: 116,931

[52] U.S. Cl. .................... 408/3, 33/181 R, 90/11 E, 408/14
[51] Int. Cl. ................... B23b 39/08, B23b 49/00
[58] Field of Search....408/1, 3, 14; 90/11 E; 33/181, 33/185

[56] References Cited

UNITED STATES PATENTS 3,478,624  11/1969  Stafford..................................408/3

Primary Examiner—Francis S. Husar
Attorney—Woodling, Krost, Granger and Rust

[57] ABSTRACT

A travel limit mechanism is disclosed which is usable with a machine tool having a plurality of tools movable into an operative position to work on a workpiece. A reference position is first established at which the tip of a first tool clears a workpiece and a first dog just actuates a switch. This establishes a first tool-limit position. THe tool is removed from the operative position and placed in an adjustable holder with the tip of the tool abutting a tool tip locator and the tool tip locator abutting the first dog. A second tool-limit position then may be easily set by placing a second tool in the adjustable holder and moving the tool tip locator into abutment with the tip thereof and also into abutment with a second dog of a second set of dog and switch means. Depth stops for setting depth of cut of the tools may also be readily set using the same mechanism. The foregoing abstract is merely a resume of one general application, is not a complete discussion of all principles of operation or applications, and is not to be construed as a limitation on the scope of the claimed subject matter.

35 Claims, 6 Drawing Figures

PATENTED JAN 16 1973

INVENTOR.
KERMIT T. KUCK
BY Woodling, Krost,
Granger and Rust
ATTORNEYS.

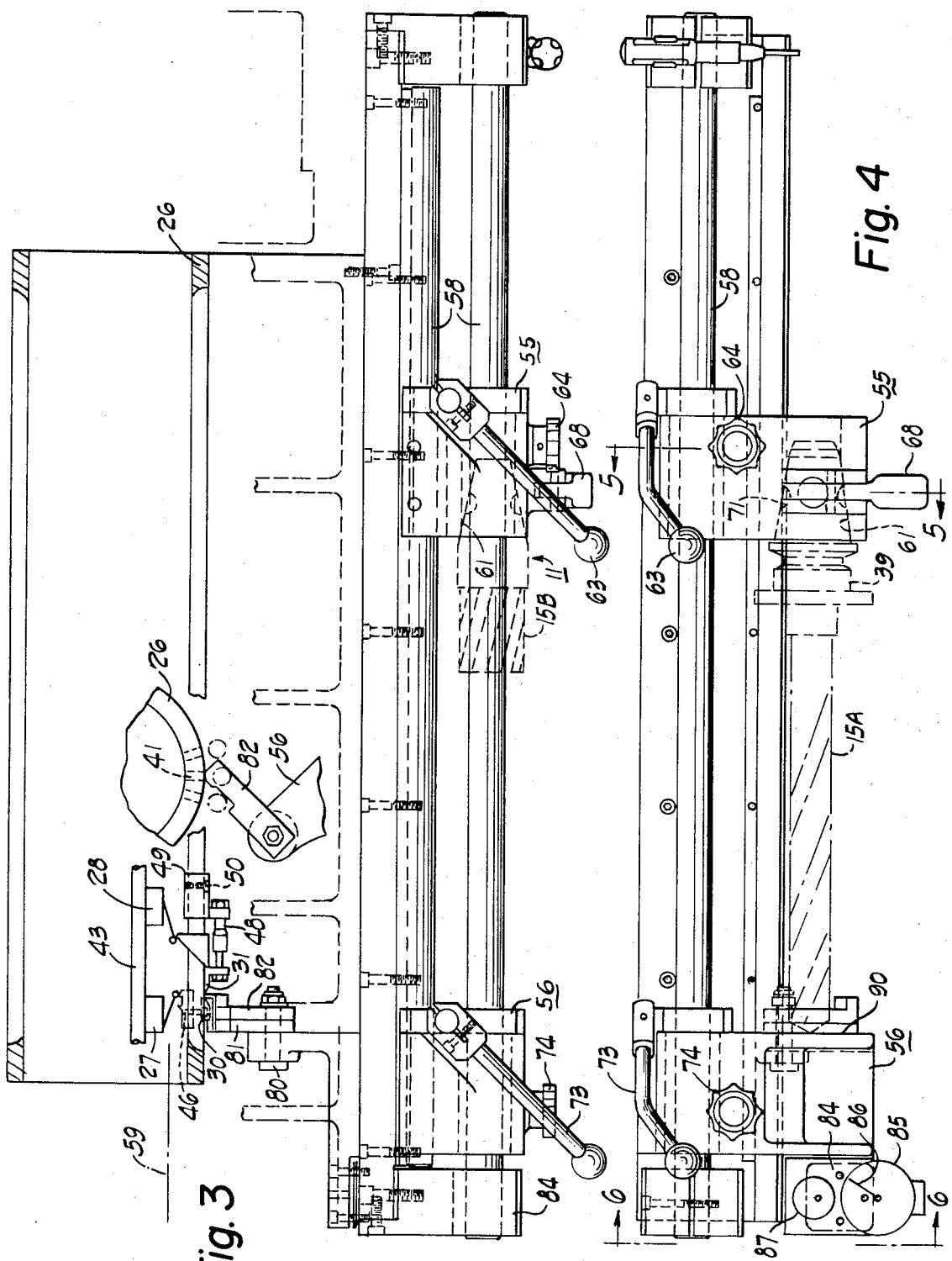

TRAVEL LIMIT MECHANISM AND METHOD

BACKGROUND OF THE INVENTION

Many machine tools have different tools which may be utilized in an operative position to work on a workpiece. A turret lathe is one example wherein a turret may have six sides each carrying a different tool and the turret may be indexed to bring different tools into the operative position. Multiple drill heads are also used on drilling machines. A more recent development is tool changers for use with many different forms of machine tools, for example, a horizontal boring machine. The individual tools are all different in order to perform different cutting or working functions on the workpiece. For convenience each of these individual tools are mounted in tool holders which have identical shapes to be successively received in the operating or rotating spindle so that these tools may cut the workpiece. A tool usually has at least two limit positions; namely, a retracted position away where the tool clears the workpiece and a depth of cut position. A third position may be provided; namely, a fully retracted position and in such case the first mentioned position may become a limit position which is one which can terminate the rapid traverse forward movement of the tool and commence a slow feed forward movement. All three of these positions will be termed tool-limit positions which limit movement of a movable member of the machine tool in accordance with actuation of a control means such as a switch at the respective position.

In some prior machine tools, screw actuated dogs have been used to set one or more of these tools limits and in general, each of these tool limits have been individually adjustably set by a tool set-up operator at the time the machine tool is set up to perform a particular machining function. With a turret lathe with six tools, this would be six individual adjustments which would have to be made for just a single travel limit on each tool. With tool changing apparatus having a tool magazine wherein perhaps 20 or 30 tools are utilized and two different tool limits are desired for each tool, this could mean 40 to 60 individual adjustments which would have to be made. This is laborious and time-consuming to actually place a tool in the operative position and move it forward to determine the proper cutting depth and then adjust the appropriate dog to actuate the switch at that time. Also such adjustment is subject to individual errors so that one tool might cut slightly too much and could thus ruin a workpiece; hence, each individual tool limit must be set with great care to avoid making scrap of the workpiece.

Accordingly, an object of the invention is to provide a tool limit mechanism which is easy and quick to operate.

Another object of the invention is to provide a tool limit mechanism wherein a reference position may be established with as much precision as is necessary and then other tool limit positions may be readily set from this first reference position with equal accuracy.

Another object of the invention is to provide a tool limit mechanism which will readily establish two different tool limit positions for a first tool.

Another object of the invention is to provide a tool limit mechanism wherein a reference position may be established for a first tool and then other tools may be utilized and referred to this reference position to establish tool limit positions of these other tools.

SUMMARY OF THE INVENTION

The invention may be incorporated in a travel limit mechanism for use with a movable member of a machine tool having a given plurality of different tools movable into an operative position for working on a workpiece, said travel limit mechanism comprising, in combination, control means, dog means to actuate said control means, one of said means being a plurality to establish sets of control and dog means with at least one set for each of the given plurality of tools, means to relatively index said control and dog means to select a set of said control and dog means, means providing relative movement along a first path between said control and dog means of said selected set in accordance with movement of the movable member, means to relatively adjust and fix along said first path a reference position of said selected set of control and dog means at which said control means is actuated to establish a first limit position of the movable member for a first tool in the operative position, means to control movement of the movable member in accordance with actuation of said control means of said selected set, and means to utilize said reference position to establish another tool-limit position of the movable member.

Other objects and a fuller understanding of the invention may be had by referring to the following description and claims, taken in conjunction with the accompanying drawing.

BRIEF DESCRIPTION OF THE DRAWINGS

FIG. 3 is an enlarged plan view partly in section of the travel limit mechanism including the indexable drum;

FIG. 4 is an elevational view of the travel limit mechanism of FIG. 3;

DESCRIPTION OF THE PREFERRED EMBODIMENT

Figure 1:
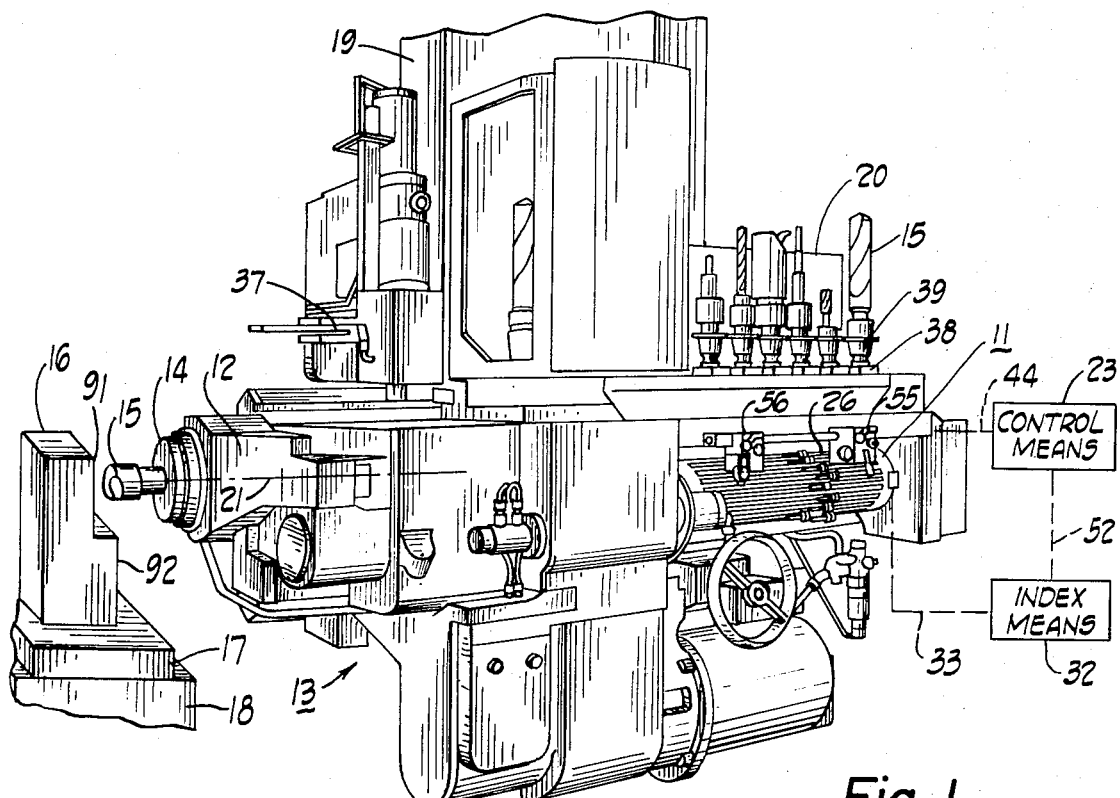
FIG. 1 is a perspective view of a machine tool embodying the invention.

The figures of the drawing show a travel limit mechanism 11 which may be used with a movable member 12 of a machine tool 13. The movable member has an operative position toolholder 14 which is adapted to receive a given plurality of tools 15 movable into the operative position for working on a workpiece 16. In this preferred embodiment the machine tool 13 is shown as a horizontal boring mill having a base 18 on which a table 17 is movable along a direction which may be called the X-axis. The workpiece 16 may be mounted on the table 17. The base 18 also carries vertical columns 19 on which a ram carrier 20 is vertically movable. This may be considered a Y-axis of movement. The ram carrier 20 journals the movable member 12 which is a ram for movement along a horizontal path perpendicular to the X-axis and this may be called the Z-axis 21 of movement. In this way three axes of relative movement between the tool 15 and workpiece 16 are available. A hydraulic servomotor, not shown, but located inside the ram 12 may be used to move this ram in either feed movements or rapid traverse movements. Control means 23 is provided to control the movement of the ram 12.

Figure 2:
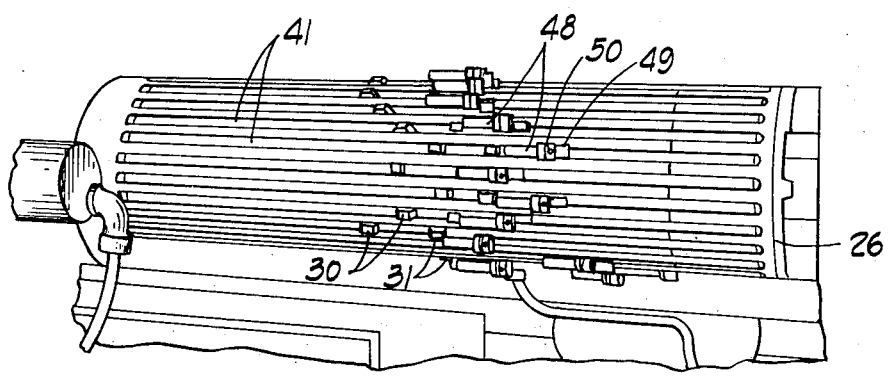
FIG. 2 is an enlarged perspective view of the indexable drum with adjustable stops.
Figure 5:
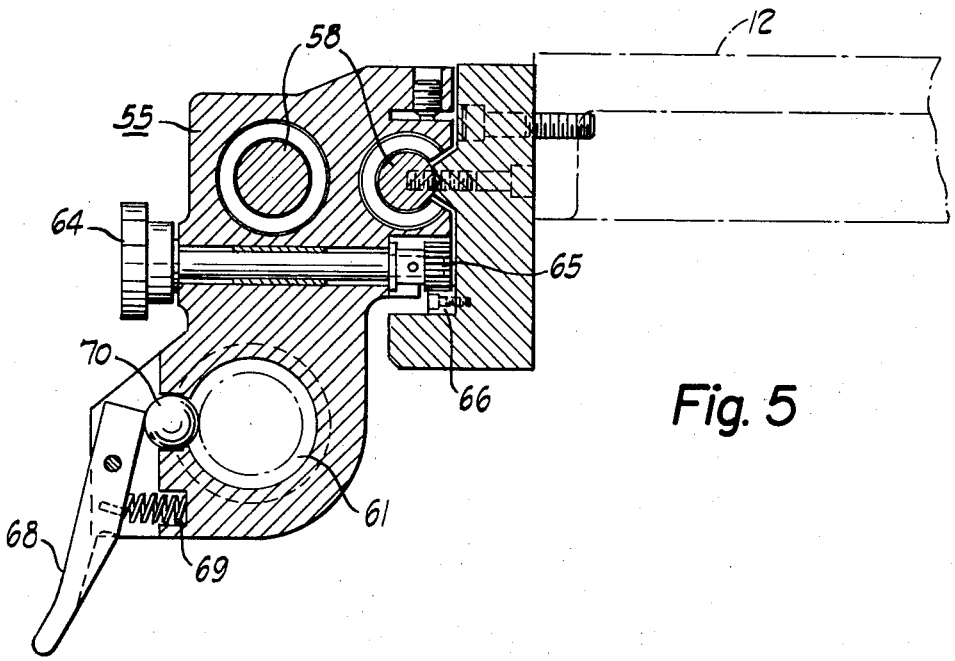
FIG. 5 is an enlarged sectional view on the line 5—5 of FIG. 4.

The travel limit mechanism 11 includes an indexable drum 26 shown in FIGS. 2 and 3. A plurality of sets of control means and dog means are provided in this travel limit mechanism. In this preferred embodiment, the control means includes switches 27 and 28. The dog means are provided in first and second groups 30 and 31. Either the dogs or the switches may be a plurality in order to form the plural sets of control and dog means and it is usually easier and more economical to use a plurality of dogs to actuate a single switch. Index means 32 is connected to index the drum 26 by a connection shown symbolically at 33. This index means by indexing the drum 32 selects a particular set of control and dog means 27, 30, 31. The drum 26 is mounted on an axis parallel to the axis of the operating spindle 14, which may be considered the Z-axis 21.

In order to have different tools in the operative spindle position, a tool changer 37 is provided to change tools from a tool magazine 38 into the operating spindle 14. Each of these tools is different in order to perform a different cutting operation on the workpiece 16, yet each tool is mounted in a holder 39 which all have the same identical external shape. In this preferred embodiment these holders are shown as having a conical shape to be received in the conical chuck of the operating spindle 14. Other forms of holders may, of course, be provided. The magazine 38 may provide for a given plurality of tools, for example, 20 and the indexable drum 26 has longitudinal slots 41 along the periphery to receive the first group of dogs 30 and the second group of dogs 31. Preferably there are more slots 41 than tools 15 in the magazine 38, for example, there may be 26 such slots 41.

The drum 26 is mounted on the ram 12 for movement therewith along the Z-axis 21. Because the drum 26 moves parallel to the Z-axis, the dogs 30 and 31 also move parallel to this Z-axis. The switches 27 and 28 are mounted internally of the drum 26 on a rod 43 which extends out the rear end of the drum and is fixed on the ram carrier 20. Accordingly, this provides relative movement between the switches 27 and 28 and dogs 30, 31 in accordance with movement of the ram 12. The switches 27 and 28 are electrically connected to the control means 23 as by a connection 44 and this control means 23 controls the movement of the ram 12. Each of the dogs 30 and 31 is adjustable along the length of the respective slot 41. A screw 46 may be tightened to fix each the dogs 30 in a fixed location along the slot. The dogs 31 are movable by a micrometer adjustment 48 relative to a block 49 and this block may be adjustably fixed along the respective slot by tightening a screw 50. The control means 23 also controls the index means 32 by a connection 52.

The travel limit mechanism 11 includes an adjustable toolholder 55 and a tool tip locator 56. These are shown enlarged in FIGS. 3 and 4. The toolholder 55 is mounted for sliding movements on slideways 58 fixed on ram 12 along a path parallel to a first path 59, shown in FIG. 3. This first path is established parallel to the Z-axis 21 and is established at a point where the plural dogs 30 and 31 cooperate with the switches 27 and 28. As the drum is indexed so that the dogs in another slot 41 are selected to be in the first path 59, then these newly selected dogs cooperate with this switch 27. The switches 27 and 28 may be any form of control means such as a fluid valve or fluid controller, but in this preferred embodiment are electrical switches. Either the switch 27 or the dog 30 may be a plurality and the plural one is that which is moved into the first path 59 to select a new set of switch and dog means or as sometimes referred to, a selected set of control means and dog means.

The adjustable holder 55 has a socket 61 suitably shaped to receive the holders 39 for the individual tools 15. In this preferred embodiment with conical holders 39, the socket is also conical. In FIG. 4 a long drill 15A is shown as a first tool in phantom to show how it is mounted in this adjustable tool holder 55. In FIG. 3 a large diameter but short end mill 15B is shown in phantom as a second tool mounted in this adjustable toolholder 55. The FIG. 1 shows many different individual tools carried in the magazine 38.

The adjustable toolholder 55 has a clamp 63 to clamp this holder at any selected position along the slideways 58. When the clamp 63 is released, the adjustable toolholder 55 may readily be slid along the slideways, or for precise adjustments, a knob 64 may rotate a pinion 65 cooperating with a rack 66 which rack is fixed on the ram 12. The slideways 58 are mounted on the ram 12 parallel to the Z-axis 21. A handle 68 is urged by a spring 69 to engage a ball 70 urging it into a locking groove 71 in any one of the holders 39. This retains the toolholder in the socket 61.

Figure 6:
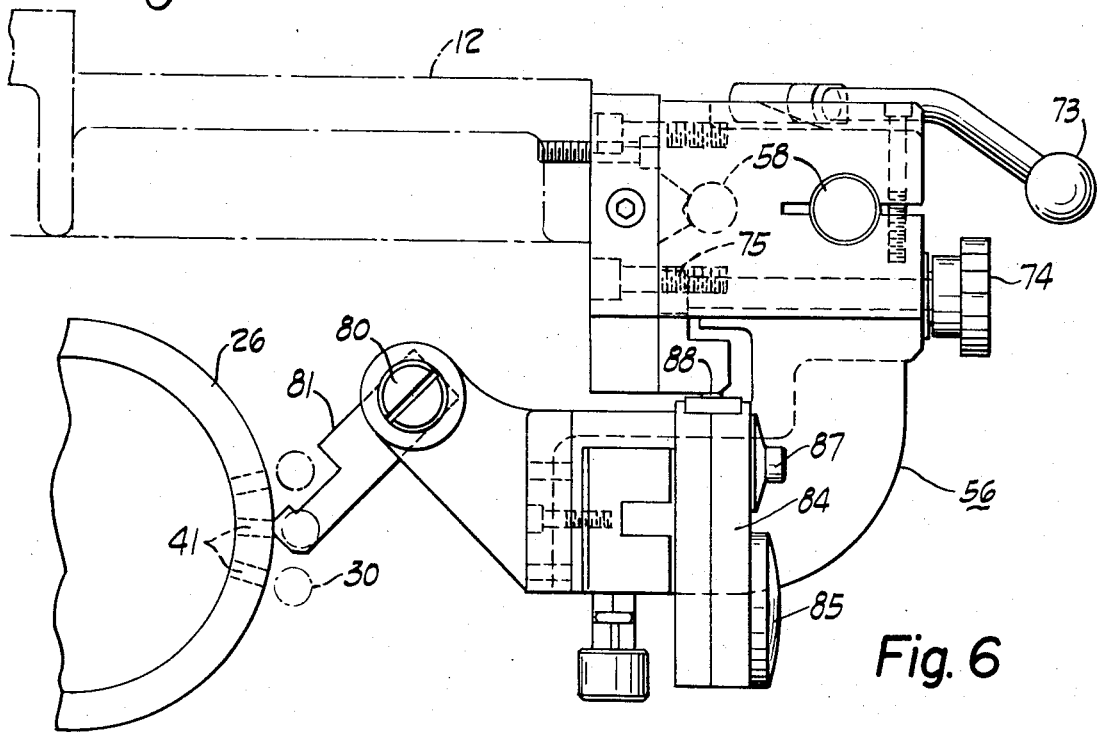
FIG. 6 is an enlarged end view on the line 6—6 of FIG. 4.

The tool tip locator 56 is also journalled for sliding movement on the slideways 58. It also has a clamp 73 which may be tightened to fix this tool tip locator at any adjusted position along the slideways which will be a position parallel to the first path 59 and parallel to the Z-axis 21. A knob 74 rotates a pinion 75 which cooperates with the rack 66 for precise movements of the tool tip locator 56 when the clamp 73 is released. The tool tip locator 56 has a first flag arm 81 and a second flag arm 82. As shown in FIG. 3, the flag arm 81 is for abutting any one of the first group of dogs 30 and the second flag arm 82 is for abutting any one of the second group of dogs 31. These flag arms are pivoted on pivot 80 on tool tip locator 56. A length measuring instrument 84 is provided on the tool tip locator 56 and because this tool tip locator moves parallel to the first path 59, this instrument will measure lengths along this first path. The length measuring instrument may be a commercially available device having an indicator dial 85 with indicator needle 86 plus a revolution counter 87. The dial 85 may be grasped and rotated to set the needle indication to zero whenever desired. The length measuring instrument has a roll 88 shown in FIG. 6 engaging a flat surface parallel to the slideways 58 in order to actuate the needle 86 and revolution counter 87 as this tool tip locator 56 is moved along the slideways.

OPERATION

The travel limit mechanism 11 may be used to readily set the positions of the dogs 30 and 31, the first dog 30 of the first selected set of switch and dog means 27, 30 is set in the usual manner. By this is meant that the first tool 15A is placed in the operative spindle 14 and the ram 12 is moved up until the tool touches a thin shim placed against a surface 91 of the workpiece 16. This shim might be one-sixteenth of an inch thick, for example, for a machined workpiece. If the surface is a rough casting, then perhaps ⅛ inch or ¼ inch shim might be desirable in order to account for differing dimensions in successive castings. With the tip of tool 15A in engagement with the shim against the workpiece, then the first dog 30 with the screw 46 loosened is moved along the respective slot 41 until the switch 27 is just actuated. The screw 46 is then tightened to lock the dog 30 in this adjusted position. The fact that the switch 27 is just actuated may be determined in any known manner, for example, by a pilot light being illuminated in the control means 23. Often the switch 27 is constructed as a double-throw switch so that the actuated position to be determined may be by a light being illuminated or a light being extinguished. From this point on the travel limit mechanism 11 comes into use. The ram 12 is retracted, the tool 15A is removed from the operating spindle 14 and placed in the adjustable toolholder 55. The tool tip locator 56 is moved along the slideways 58 until the flag arm 81 abuts the selected first stop 30. The clamp 73 is then actuated to hold the tool tip locator 56 in this position. Next the adjustable toolholder 55 is moved along the slideways until the tip of tool 15A abuts an abutting surface 90 on the tool tip locator 56. The adjustable toolholder 55 is then clamped in this position. This establishes the adjustable toolholder 55 at a predetermined fixed relationship relative to the operative spindle toolholder 14 for that particular first tool 15A. It might be 36 inches to the rear of this operative position spindle 14, merely as an example. The reason for this is to get the entire travel limit mechanism moved to the rear or out of the way of the workpiece cutting area so that successive stops 30 and 31 may be set without interfering with the workpiece cutting area. The adjustable toolholder 55 thus remains in this particular adjusted and fixed position for the remainder of the set-up procedure relative to workpiece surface 91.

The above procedure establishes an actuation of the switch 27 at a point whereat the tip of tool 15A will just clear the workpiece. This may be called an R stop and may be used to control the point at which retraction of the tool ceases and also the point at which the in-feed will commence. In most machine tool applications it is desirable to provide a Z stop or a point at which a selected dog 31 will actuate switch means to limit the depth of cut of that particular tool. Dog 31 may actuate the same switch 27, but for greater flexibility, it is preferred that it actuate a separate switch 28. Suppose the part program for the part being machined indicates that this depth of cut is to be 2 ½ inches inwardly from this first R stop. Accordingly, to set the Z stop determined by dog 31, the flag arm 81 is moved out of the way and flag arm 82 is brought into position adjacent the first path 59. The length measuring instrument 84 is set to zero by rotating the dial 85. The tool tip locator 56 is relieved to the left to permit removal of the cutting tool 15A from the adjustable toolholder 55. The tool tip locator 56 is returned to the zero position and actually moved beyond it 2.5 inches as read on the length measuring instrument 84. The tool tip locator 56 is clamped at this point and the Z point stop or dog 31 is moved into abutment with the flag arm 82. In this case both the dog 31 and the block 49 are moved as a unit, the micrometer adjustment 48 not being required to be moved, and the screw 50 is tightened to establish this Z point stop dog 31 just 2.5 inches away from the point of actuation of switch 27 by dog 30.

The second tool of the many tools in the magazine 38 is shown as being an end mill 15B. The first tool 15A is returned to the magazine 38 and the second tool 15B is placed in the adjustable toolholder 55. The index means 32 is indexed to bring the next selected set of dogs 30, 31 into the first path 59. The clamp 73 is loosened and tool tip locator 56 is moved up until the abutting surface 90 abuts the tip of end mill tool 15B and clamped in place. Flag arm 81 is swung into position adjacent first path 59 and the second selected dog 30 is moved along the longitudinal slot 41 into abutment with this flag arm and clamped in place by screw 46. This sets this second dog 30 in place as an R stop for the second tool 15B. For example, if the second tool 15B is 10.317 inches shorter than the first tool 15A, then the second selected dog 30 will be adjusted to a position 10.317 inches to the right of the first selected dog 30, which was in the reference position. This reference position establishes a first tool-limit position of the tool 15A. The Z stop 31 may be considered as establishing a second tool-limit position of this first tool 15A. Alternatively the second selected stop 30 may be considered as establishing a second tool-limit position of the second tool 15B.

The Z point stop dog 31 for the second tool 15B may be set in a manner similar to that for the first tool. The length measuring instrument 84 is set at zero with the tool tip locator 56 abutting the tip of tool 15B and with flag arm 81 abutting the second selected dog 30. The tool tip locator 56 is relieved to the left, as viewed in FIG. 4, and the second tool 15B removed from the adjustable toolholder 55. From the part program one determines the distance between the R point and the Z point for this second tool 15B. For example, assume this is 0.257 inches. The tool tip locator is moved back to the zero position and on through it until it reads 0.257 inches. The tool tip locator 56 is clamped in this position, the flag arm 82 is swung into position, and the Z stop dog 31 is moved into abutment with it and tightened in this position. The remaining R stop dogs 30 and Z stop dogs 31 for the remaining tools may be set by following the above sequence of steps, indexing the drum 26 to select a new set of dogs for each tool.

It is not uncommon for workpieces 16 to require machining operations on work surfaces in different planes. FIG. 1 shows such a workpiece, and let it be assumed that the first reference position of the first dog 30 was set with respect to a workpiece surface 91. This FIG. 1 shows a second workpiece surface 92 on which additional machining operations are required and let us assume that this second R point is 2.0 inches from the first R point. In order to set tools for this new R point, one uses the last tool which required the original or first R point. With this last tool still in the adjustable toolholder 55, the tool tip locator 56 is brought into abutment with the tip of the tool and the length measuring instrument 84 is zeroed at this point. The tip of the tool is relieved from the tool tip locator by unlocking and moving the adjustable toolholder 55. The tool tip locator is moved in the appropriate direction the proper amount as observed on instrument 84, 2.0 inches in the above example. It is moved to the right as viewed in FIGS. 3 and 4. The tool tip locator is clamped in this new position. The tip of the tool is moved into abutment with the abutting surface 90 and the adjustable toolholder 55 is clamped in this new position. This will now be 38 inches to the rear of the operating spindle position 14, in the above example. R and Z points for the tools working on this workpiece surface 92 may then be set as described above.

The travel limit mechanism 11 is a means to utilize the reference position of the first R stop dog 30 to establish another tool-limit position of the movable member or ram 12. This utilization means senses the length of the first tool 15A relative to the length of the second tool 15B. This length sensing is accomplished by moving the tool tip locator 56 parallel to the first path 59 and setting a dog, either dog 31 or second dog 30, in accordance with this sensed length. The tool tip locator 56 senses the location of the tip of the first tool and also the location of the tips of each of the succeeding tools. It does this by abutting such tool tips. The adjustable toolholder 55 is a means to abut the holders 39 of the various tools and actually holds such tools in a position parallel to the first path 59. The tool tip locator 56 is movable to abut the dogs 30 or the dogs 31 and thus these are plural means of the plurality of dog means and control means. The travel limit mechanism 11 accordingly provides a quick and accurate means for setting the Z point stops and the remaining R stops. In the old way of individually setting stops, there could easily be a variation of 0.005 inches or 0.010 inches in the various stops from the desired location. This was especially true unless considerable care were taken. Now with the present mechanism, the first dog 30 is accurately set in the reference position and from then on all of the other dogs are quickly set with accuracy easily within 0.001 inches. This considerably reduces the set-up time for a new workpiece.

The indexable drum 26 in this preferred embodiment has 26 longitudinal slots 41 for only 20 tools, for example, in the magazine 38. The reason for this is to be able to establish multiple R points in case the workpiece would have up to six different planes such as the workpiece surfaces 91 and 92.

The R stop dogs 30 may be used for additional purposes. The ram 12 may have a home position at which it is fully retracted away from the workpiece 16. The ram 12 may then move forward in rapid traverse and when the R stop dog 30 trips the switch 27, at a point only one-sixteenth inch away from the workpiece, for example, the forward movement will change to a feed movement so that the tool may properly cut the workpiece 16. Thus it will be seen that this R stop dog 30 does not necessarily reverse the movement of the ram 12; it may merely control movement changing it from rapid traverse to feed movement.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A travel limit mechanism for use with a movable member of a machine tool having a given plurality of different tools movable into an operative position for working on a workpiece, said travel limit mechanism comprising, in combination, control means, dog means to actuate said control means, one of said means being a plurality to establish sets of control and dog means with at least one set for each of the given plurality of tools, means to relatively index said control and dog means to select a set of said control and dog means, means providing relative movement along a first path between said control and dog means of said selected set in accordance with movement of the movable member, means to relatively fix along said first path an adjusted reference position of said selected set of control and dog means at which said control means is actuated to establish a first limit position of the movable member for a first tool in the operative position, actuation of said control means by said dog means of said selected set being capable of controlling movement of the movable member, and means to utilize said reference position to establish another tool limit position of the movable member.

2. A travel limit mechanism as set forth in claim 1, wherein said utilization means includes a means to sense the length of the first tool relative to the length of a second tool.

3. A travel limit mechanism as set forth in claim 1, wherein said utilization means includes means to sense the location of the tool tip of the first tool.

4. A travel limit mechanism as set forth in claim 3, wherein said sensing means includes means to sense the length of a second tool.

5. A travel limit mechanism as set forth in claim 1, wherein said utilization means includes means to abut the tip of the first tool.

6. A travel limit mechanism as set forth in claim 5, wherein each of the tools has a holder, and said utilization means includes means to abut the holder of the first tool.

7. A travel limit mechanism as set forth in claim 6, wherein said utilization means includes means to determine the difference in length between first and second tools.

8. A travel limit mechanism as set forth in claim 1, wherein said utilization means includes an adjustable toolholder to hold tools adjacent the first path, and a tool tip locator to abut the tip of the first tool while in said adjustable holder.

9. A travel limit mechanism as set forth in claim 8, wherein said adjustable holder is movable parallel to said first path.

10. A travel limit mechanism as set forth in claim 9, wherein said tool tip locator is movable parallel to said first path.

11. A travel limit mechanism as set forth in claim 10, wherein said tool tip locator is movable to abut said plurality of control means or dog means in each set.

12. A travel limit mechanism as set forth in claim 10, wherein said plurality of means is a plurality of dog means, and wherein said tool tip locator is movable to abut tips of tools and also abut dog means of sets corresponding to the respective tools.

13. A travel limit mechanism as set forth in claim 12, wherein said plurality of means is a plurality of dog means, and a drum carrying said plurality of dog means to be longitudinally movable along the surface of said drum parallel to said first path.

14. A travel limit mechanism as set forth in claim 13, wherein said utilization means includes slide ways parallel to said first path and to the axis of said drum, and means mounting said tool tip locator and said adjustable holder on said slideways.

15. A travel limit mechanism as set forth in claim 14, wherein said utilization means includes means to fix said tool tip locator and said adjustable holder in adjusted positions along said slideways.

16. A travel limit mechanism as set forth in claim 8, including first and second groups in said plurality of means, and wherein said utilization means includes a length measuring instrument for measuring along said first path, said tool tip locator being abuttable with said one of said plural means and with the tip of a tool in said adjustable toolholder, and said tool tip locator being movable a predetermined distance as measured by said length measuring instrument to set one of said plural means of the second group along said first path to establish a second tool-limit position of the first tool.

17. A travel limit mechanism as set forth in claim 8, including a length measuring instrument on said tool tip locator, said tool tip locator being movable a predetermined distance along said first path as determined by said length measuring instrument to set the position of another of said plural means of a second selected set in abutment with said tool tip locator.

18. A travel limit mechanism as set forth in claim 8, including a length measuring instrument on said tool tip locator, said adjustable toolholder and tool tip locator being movable a predetermined distance along said first path as determined by said length measuring instrument to set the position of another of said plural means of a second selected set in abutment with said tool tip locator.

19. A method of setting travel limits for a movable member of a machine tool having a given plurality of tools movable into an operative position for working on a workpiece, said method comprising the steps of establishing a plurality of control means or dog means for a plurality of sets of control and dog means with at least one set for each of the given plurality of the tools, indexing relative to one another the control and dog means to select a set of said control and dog means, relatively moving along a first path the control and dog means of the selected set in accordance with movement of the movable member, adjustably fixing along the first path at a reference position one of the plural means of the selected set of control and dog means at which the control means is actuated to establish a first tool-limit position of the movable member for a first tool in the operative position, and utilizing said reference position to establish another tool-limit position of the movable member.

20. The method as set forth in claim 19, wherein said utilizing step includes the establishing of a first limit position of the movable member for a second tool in the operative position.

21. The method as set forth in claim 20, wherein said utilizing step includes sensing the length of the first tool relative to the length of the second tool.

22. The method as set forth in claim 19, wherein said utilizing step includes the establishing of a second limit position of the movable member for the first tool in the operative position.

23. The method as set forth in claim 19, wherein said utilizing step includes holding the first tool in a position adjacent the first path, and locating the tip of the first tool in accordance with the reference position.

24. The method as set forth in claim 19, wherein said utilizing step includes holding the first tool in an adjustable tool holder adjacent the first path, abutting the tip of the first tool against a first stop determined by said reference position, providing a length measuring instrument for movement relative to said first path, selecting a second set of control and dog means, and using the length measuring instrument in moving the adjustable toolholder to set one of said plural means of said second set along said first path to establish a second tool-limit position of the first tool.

25. The method as set forth in claim 19, wherein said utilizing step includes holding the first tool in an adjustable holder in a position adjacent the first path, abutting the tip of the first tool with a tool tip locator which also abuts said one of said plural means in the selected set to establish said reference position.

26. The method as set forth in claim 25, wherein said utilizing step includes placing a second tool in the adjustable holder, moving the tool tip locator into abutment with the tip of the second tool, and setting the dog means of the second set in abutment with said tool tip locator.

27. The method as set forth in claim 25, wherein said utilizing step includes providing a length measuring instrument of said tool tip locator relative to said first path, using the length measuring instrument in moving the adjustable toolholder and tool tip locator a predetermined distance along said first path, selecting a second set of control and dog means,
and setting the position of one of the plurality of means of said second set in abutment with said tool tip locator.

28. The method as set forth in claim 25, wherein said utilizing step includes providing a length measuring instrument of said tool tip locator relative to said first path,
zeroing the length measuring instrument with the tool tip locator in abutment with the tip of the first tool,
using the length measuring instrument in moving the adjustable toolholder and tool tip locator a pre-determined distance along said first path and clamping same in a new location,
selecting a second set of control and dog means,
and setting the position of one of the plurality of means of said second set in abutment with said tool tip locator.

29. The method as set forth in claim 25, wherein said utilizing step includes providing a length measuring instrument on said tool tip locator,
zeroing the length measuring instrument with the tool tip locator in abutment with the tip of the first tool,
moving the adjustable toolholder and tool therein away from the tool tip locator,
using the length measuring instrument in moving the tool tip locator a pre-determined distance along said first path and clamping same in a new location,
moving the tool so its tip touches the tool tip locator and clamping the adjustable toolholder along said first path,
selecting a second set of control and dog means,
and setting the position of the one of the plurality of means of said second set in abutment with said tool tip locator.

30. The method as set forth in claim 19, wherein said utilizing step includes holding the first tool in an adjustable holder in a position adjacent the first path, and locating the tip of the first tool in accordance with the reference position.

31. The method as set forth in claim 23, wherein said utilizing step includes abutting the tip of the first tool with a tool tip locator which also abuts the one means of the plurality of means in the selected set.

32. The method as set forth in claim 23, wherein said utilizing step includes abutting the tip of the first tool against a first stop determined by said reference position,
establishing first and second groups in said plurality of means,
abutting the tool tip locator with one of the plural means of the selected set of the first group and fixing said one of said plural means along said first path for a first limit position of the movable member,
providing a length measuring instrument for movement relative to said first path,
and using the length measuring instrument to set one of said plural means of the second group along said first path to establish a second tool-limit position of the first tool.

33. The method as set forth in claim 23, wherein said utilizing step includes abutting the tip of the first tool with a tool tip locator,
establishing first and second groups in said plurality of means,
abutting the tool tip locator with one of the plural means of the selected set of the first group in establishing said first tool-limit position of the movable member,
providing a length measuring instrument of said tool tip locator relative to said first path,
using the length measuring instrument to move the tool tip locator a pre-determined distance from the first tool limit position,
and setting one of said plural means of the second group in abutment with the tool tip locator and fixed along said first path to establish a second tool-limit position of the first tool.

34. The method as set forth in claim 23, wherein said utilizing step includes abutting the tip of the first tool with a tool tip locator,
establishing first and second groups in said plurality of means,
abutting the tool tip locator with one of the plural means of the selected set of the first group fixing said one of said plural means along said first path for a first limit position of the movable member,
providing a length measuring instrument of said tool tip locator relative to said first path,
zeroing the length measuring instrument while the tool tip locator is in abutment with said one of said plural means of the first group,
using the length measuring instrument to move the tool tip locator a pre-determined distance from the zero position,
and setting one of said plural means of the second group in abutment with the tool tip locator and fixed along said first path to establish a second limit position of the first tool.

35. The method as set forth in claim 23, wherein said utilizing step includes abutting the tip of the first tool with a tool tip locator,
establishing first and second groups in said plurality of means,
abutting the tool tip locator with one of the plural means of the selected set of the first group and fixing said one of said plural means along said first path for a first limit position of the movable member,
providing a length measuring instrument on said tool tip locator,
zeroing the length measuring instrument while the tool tip locator is in abutment with said one of said plural means of the first group,
relieving the tool tip locator away from the tool tip,
removing the tool from the holder,
using the length measuring instrument to move the tool tip locator a pre-determined distance from the zero position,
and setting one of said plural means of the second group in abutment with the tool tip locator and fixed along said first path to establish a second limit position of the first tool.

* * * * *